2,438,412

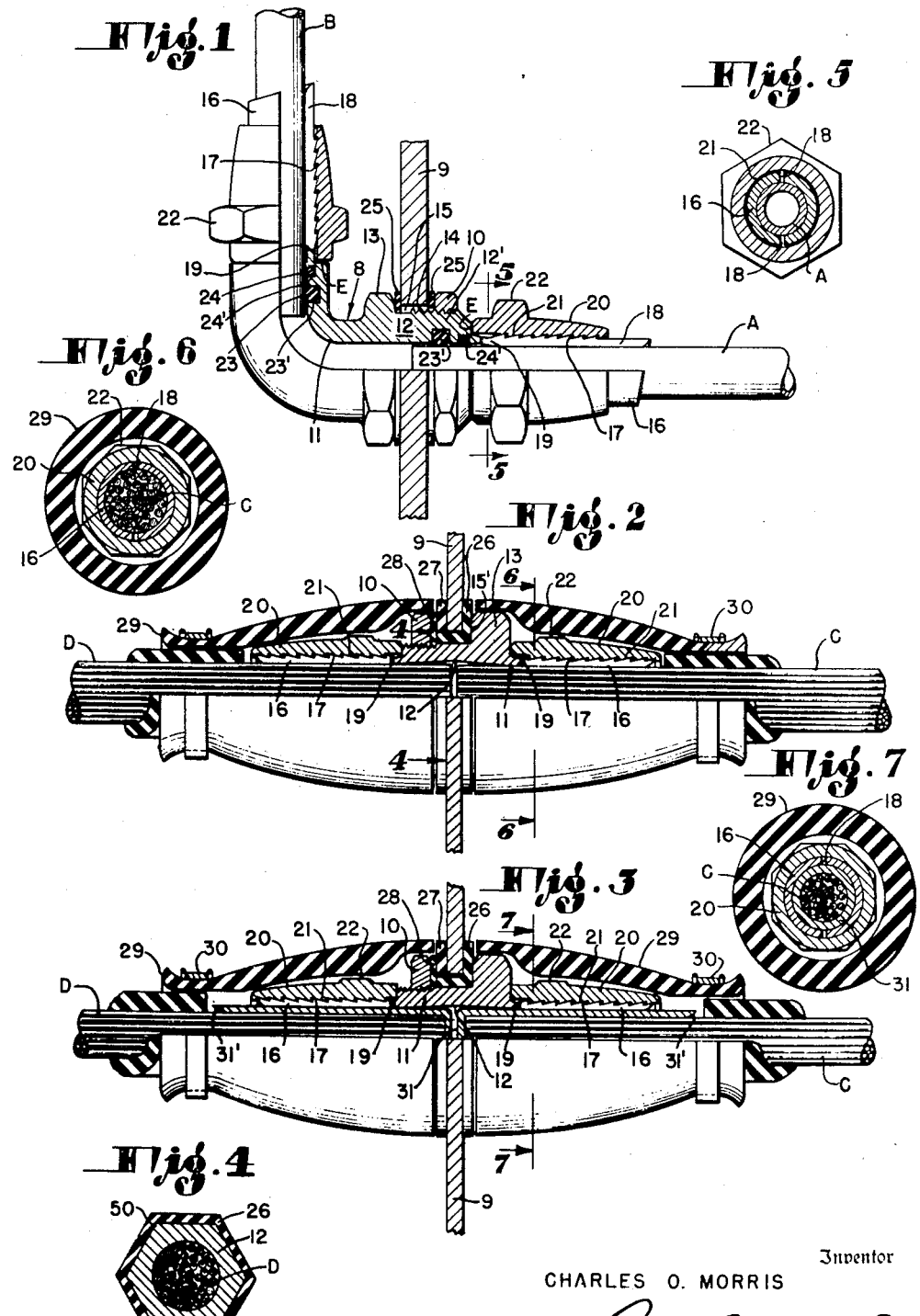
March 23, 1948. C. O. MORRIS 2,438,412
CONDUIT COUPLING
Filed Dec. 13, 1944
Inventor
CHARLES O. MORRIS
Attorney Patented Mar. 23, 1948

UNITED STATES PATENT OFFICE 2,438,412

CONDUIT COUPLING

Charles O. Morris, Van Nuys, Calif., assignor to The Garrett Corporation, Airesearch Manufacturing Company division, Los Angeles, Calif., a corporation of California Application December 13, 1944, Serial No. 568,013

3 Claims. (Cl. 174—153)

This invention relates to connectors, and particularly to connectors for coupling conduits or conductors. The inventive concepts are eminently well adapted for utilization in connecting conduits or conductors together through or at partitions, such as the bulkheads of aircraft, especially in the so called "pressurized" compartments thereof. However, the invention is equally well adapted for utilization in other and analogous fields and is, in fact, limited in the fields of use and in the embodiments which it can take, only by the scope of the accompanying claims.

It is commonly the practice, when connecting two flow-entraining members, such as two tubes, in end-to-end relationship, to flare the adjacent ends of the tubes and to interpose therebetween a spacer or the like, to make a seal. This flaring of the tube ends tends to weaken same, and repeated coupling and uncoupling of the flared ends eventually results in mutilation of the tube ends. Thereafter, a good or satisfactory connection of the conduits can no longer be achieved and the tubes become useless.

It is among the objects of the invention to provide a connector of such a nature that the conduits or conductors need not be flared or otherwise deformed or mutilated in any portion thereof, in order to establish a satisfactory connection of the conduits, and whereby the conduits may be coupled and uncoupled repeatedly without damage to the conduits. Thereby, the initial tightness of the connection will be maintained through a repeated number of coupling and uncoupling uses of the connector on the same conduits.

Most connectors for connecting conduits end-to-end, and especially round conduits, cannot seize or bear equally upon every square inch of the length of the conduits included within the coupling, usually contacting the conduits, at best, in only a few points or in a restricted area.

It is another object of the invention to provide a connector in which the portions of the connector that contact the conduits will all seize and grip equally throughout every square unit of area of the conduits included within the connector and all along the length of the end of each conduit.

It is also commonly necessary in connectors in this field, in obtaining a seal between the ends of the conduits, to employ such a large number of complex parts in the construction thereof as to render the operations of connecting and disconnecting the conduits somewhat laborious and quite time consuming.

It is a further object of this invention to provide a connector in which it will be necessary only to insert the ends of the conduits and to manipulate but two members, in order to establish a satisfactory union of the conduits and, at the same time, to establish an unusually good seal between the conduits and the connector and the bulkhead. Thus, the connector will enable the relatively quick and easy coupling and uncoupling of conduits, especially of round conduits, heretofore quite difficult to couple satisfactorily.

It is also an object of the invention to provide a connector which can be used to connect together conduits that are not truly of the hollow-tube variety, as well as for connecting hollow tubes. That is to say, the invention aims to provide a connector which can be utilized to connect conduits which are specifically in the form of electrical conductors, in the same novel manner and with the same improved results as indicated above with reference to the connection of tubes.

The other objects and features of the invention will either be made manifest or become apparent as this disclosure progresses.

A few of the presently preferred embodiments of these and other inventive concepts are illustrated, by way of example only, in the accompanying drawings, and are described hereinafter in conjunction with said drawings, but it is to be understood that the invention can take many other forms, all lying within the scope of the sub-joined claims.

In these drawings,

Fig. 1 is a view, partly in elevation and partly in section, of one of the novel connectors constructed for connecting two conduits end to end through a bulkhead in a "pressurized" airplane;

Fig. 2 is a similar view showing another type of the present connector constructed for connecting two electrical conductors end to end through an aircraft bulkhead;

Fig. 3 is a similar view of a similar connector, modified in certain respects hereinafter particularized;

Fig. 4 is a cross section taken substantially on the line 4—4 of Fig. 2, sighting in the direction of the arrows;

Fig. 5 is a cross section on the line 5—5 of Fig. 1, sighting in the direction of the arrows;

Fig. 6 is a cross-section on line 6—6 of Fig. 2, sighting in the direction of the arrows, and Fig. 7 is a cross-section on the line 7—7 of Fig. 3, sighting in the direction of the arrows.

Referring to the particular embodiments shown in the drawings, and referring first to the embodiment of Fig. 1, the showing includes a connector indicated generally by the reference character 8; a partition or bulkhead 9, and two round conduits, A and B. The connector 8 includes a substantially tubular member 11, and hence, is primarily adapted to serve as a connector of round members having a substantially medially located peripheral enlargement 12, one end of which is formed into an annular member 13, preferably integral therewith, and the other end of which bears threads 12'. On these threads is movably mounted a complementarily threaded member 10. The body of the tubular member, at or near its medial portion, passes through an aperture 15 in the bulkhead 9. The movable member 10 is here shown as constituting a jamb nut with a polygonal periphery and including a washer 25 between its inner face and the adjacent face of the bulkhead 9. The member 13 is here shown as a polygonal flange extending radially outwardly all around the periphery of the body member 12. A washer 25', similar to the washer 25, is mounted around the periphery of the tubular member between the member 13 and the bulkhead 9.

By virtue of this construction, the tubular member may be inserted through the aperture in the bulkhead from the left of Fig. 1 and then drawn tightly in a jamb fit against the bulkhead by setting up upon the nut 10 until it jamb fits the other side of the bulkhead.

The tubular member 11 on each lateral side of the enlargement 12, is formed into sleeve-like members 16 constituting integral extensions of the enlarged medial portion 12. The outer periphery of a portion of the length of each sleeve member 16 is formed with a spiral wedge 17, for reasons hereinafter particularized. Each sleeve 16 is provided with a plurality of slots 18 extending longitudinally thereof for substantially the full length of the sleeve. In the form shown, there are two of these longitudinal slots 18, arranged on diametrically opposite sides of the sleeve members 16, as shown in Fig. 5. Each of the lateral or outer faces of the enlarged portion 12 is provided with an abutment E, and adjacent this abutment, the sleeve is grooved peripherally with an annular depression 19, which, in addition to other functions to be particularized, serves as a thread relief for the threads 17.

Surrounding the exterior periphery of each sleeve 16 is a member 20, having spiral wedge formations on its internal periphery, as indicated at 21, which are complementary to the formations 17. These complementary wedge formations 17 and 21, are adapted, after member 20 has been set up upon until its forward end contacts the abutments E and is then further tightened, to set up, by the disalignment of the complementary wedges on the member 20 and on the member 16, inwardly directed, unbalanced forces along the entire length of each sleeve 16. These radially directed forces contract each sleeve 16 tightly against the sub-adjacent portions of conduits A and B to thereby establish, throughout the length of each conduit that lies sub adjacent to each sleeve 16, a binding or gripping action. This gripping action is sufficient not only to establish a fluid-tight connection between the tubular member and each conduit, but also securely, but releasably, holds the conduits in place. Each member 20 is preferably provided with a polygonal-sided annular flange 22 for facilitating the turning of the member in quickly tightening or loosening the coupling and connection.

In order to insure against leakage of the fluid from between the ends of the conduits laterally outwardly through the ends to the sleeve 16, the tubular member 11 is provided with annular packing grooves on its interior periphery near each end of the enlarged, substantially medial portion thereof. The packing groove 23 is larger than the packing groove 24, and the groove 23 bears a packing ring 23', while the groove 24 bears a packing ring 24'.

To connect the conduits A and B at the bulkhead, the tubular member 11, minus the right hand member 10 and minus the right hand member 20, is inserted through the aperture 15. Conduits A and B are then respectively inserted in the respective ends of the member 11. Member 10 is then applied to member 12 and set up upon to pull member 13, and itself, into fluid-tight contact with the bulkhead. Thereafter, the members 20 are advanced towards abutments E and after contact therewith, are still further rotated, thus contracting the entire length of each sleeve 16 against the respective tube ends.

These operations are few in number and quickly executed, and in disconnecting the tubes, the operations reduce to merely loosening each member 20.

In the embodiment shown in Fig. 2, the present novel fitting or connector is adapted to connect two electrical conductors C and D, here shown as electrical cables of the multi-strand type arranged with their ends in juxtaposition within the confines of a bulkhead 9. The cables are aligned with each other in a straight line as shown, and are united in line by a tubular member 11' having, as in Fig. 1, a substantially medial enlargement 12, and a sleeve 16 extending laterally from each side thereof. A similar flange 13 is provided on the tubular member at one side of the bulkhead, and the member 12 on the other side of the bulkhead is threaded to receive a jamb nut 10 similarly to the construction shown in Fig. 1.

Each sleeve 16 has its outer periphery provided with a spiral wedge thread 17 as in Fig. 1, and fitting over each sleeve is a member 20, provided on its interior periphery with complementary spiral wedge threads 21 in a manner similar to that shown in Fig. 1. Setting up upon the members 20 until their inner ends excessively abut against the enlargement 12, in the manner shown in Fig. 1, produces the result of contracting each sleeve radially inwardly into tight electrical contact with each of the cables C and D, and also seizes these cables and connects them in the bulkhead in a quickly connectible and disconnectible fashion.

A seat 15' is defined on the enlargement 12 by the juxtaposition of the members 10 and 13, and in this seat is mounted an insulating grommet 26, composed, for example, of regenerated rubber, and having the shape, in cross section, of a reversed L. The upper leg of the grommet is annular in shape and bears against the adjacent side of the bulkhead, while the lower leg of the L is also annular in shape and bears against the "hot" member 12 on one side and against the bulkhead on the other side. A separate insulating washer 27 is also provided, to complete the insulation of the bulkhead 9. For purposes of structural rigidity and strength, a metal washer 28 is also provided between the nut 10 and the insulating washer 27.

Mounted around each end or half of the assembly is an insulating cap 29 of a generally conical form. Each cap has its inner end tightly in contact with the subadjacent annular protuberance on the member 12 and has its outer end in contact with the unstripped insulation of the cables C and D, respectively. The outer end of each cap is securely clamped to the sub adjacent cable by means of circular clip members 30, here shown as of the quick-acting luggage type of clamp.

This embodiment, though necessarily including a larger number of parts than the preceding one, is also quickly connectible and disconnectible. It requires a slightly greater amount of time, however, due to the necessity for first removing the end caps, to disconnect the cables; and for applying the end caps to the metallic components, after the connection has been established.

The embodiment shown in Fig. 3 is constructed in a manner involving the same principles as those embodied in the construction shown in Fig. 2, and departs structurally therefrom mainly in the inclusion of members 31 provided for augmenting the electric contact surface, and preventing arcing and electrolysis. A member 31 is attached to and around each inner end of each of the abutting cables C and D. The thimbles 31 are alike in construction and function and consist preferably of hollow cylinders closed at their inner ends and open at their outer ends, these outer ends being also chamfered outwardly as shown at 31', for ease in applying the thimble to the cable end. It is not necessary to solder these thimbles to the multi-strand cables, even though the strands may be so laid as to leave gaps or spaces between the threads, and the thimbles are of such inner diameter relative to the outer diameter of the cables as to fit same in a tight manner, to prevent arcing an electrolysis thereat. The smooth cylindrical outer periphery of the thimbles provide an equally good electrical contact for the inwardly urged sleeve 16 of the connector.

As best seen in Fig. 4, where the portion 12 of the tubular member 11 passes through the bulkhead 9, the periphery of the member 12, in the embodiments of Figs. 2 and 3, is constructed with a polygonal contour, here shown as that of a hexagon 50, around which is seated the correspondingly polygonally-shaped grommet base 26. The aperture through the bulkhead at this point has its periphery correspondingly polygonally-shaped to fit congruently against the sides of the hexagon of the grommet 26. By virtue of these holding means, the connector and the cables seized thereby are prevented from rotational displacement and are maintained immobile in their desired position in the bulkhead.

The connector is connected to the cables and disconnected therefrom in a manner similar to that set forth in connection with the embodiment of Fig. 2.

In connection with the embodiment of Fig. 1, it is to be understood that, if desired, a plurality of separate insulated wires or conductors may be run through the tubes A and B and the member 11, instead of the fluid described. Thereby, the air tight integrity of the pressurized compartment is maintained although enabling a quick connection and disconnection of the wires at the bulkhead.

What I claim as new and of my invention, is:

1. In a connector for coupling conduit or conductor elements through a bulkhead having an aperture therein, the combination of: an elongate tubular member adapted to be positioned in said aperture with its ends disposed on opposite sides of the bulkhead; means carried by each end of said tubular member for connection with an end of a coupled element; a pair of clamping elements carried by said member arranged to be respectively positioned on opposite sides of said bulkhead and be actuated into clamping relation with respect to the bulkhead; and an annular insulating member between the tubular member and the periphery of said aperture having associated end portions of insulating material extending outwardly between the clamping members and the bulkhead, said aperture and members being so formed as to prevent by their interengagement relative rotation between said members and the bulkhead.

2. In a connector for coupling conduit or conductor elements through a bulkhead having an aperture therein, the combination of: an elongate tubular member adapted to be positioned in said aperture with its ends disposed on opposite sides of the bulkhead; means carried by each end of said tubular member for connection with an end of a coupled element; a pair of clamping elements carried by said member arranged to be respectively positioned on opposite sides of said bulkhead and be actuated into clamping relation with respect to the bulkhead; an annular insulating member between the tubular member and the periphery of said aperture having associated end portions of insulating material extending outwardly between and beyond the clamping members; and an insulating protective member surrounding each end of the tubular member and a clamping element, one end of the protecting member being in closely spaced substantially abutting relation with the adjacently disposed sides of said end portions and the other end thereof extending over and closely surrounding the element coupled by the adjacent end of the tubular member.

3. In a connector for coupling conduit or conductor elements through a bulkhead having an aperture therein, the combination of: an elongate tubular member adapted to be positioned in said aperture with its ends disposed on opposite sides of the bulkhead; means carried by each end of said tubular member for connection with an end of a coupled element; a pair of clamping elements carried by said member arranged to be respectively positioned on opposite sides of said bulkhead and be actuated into clamping relation with respect to the bulkhead; an annular insulating member between the tubular member and the periphery of said aperture having associated end portions of insulating material extending beyond and outwardly between the clamping members and the bulkhead, said aperture and members being so formed as to prevent by their interengagement relative rotation between said members and the bulkhead; and an insulating protective member surrounding each end of the tubular member and a clamping element, one end of the protective member being in closely spaced substantially abutting relation with the adjacently disposed sides of said end portions and the other end thereof extending over and closely surrounding the element coupled by the adjacent end of the tubular member.

CHARLES O. MORRIS.

REFERENCES CITED

The following references are of record in the file of this patent:

(References on following page)

UNITED STATES PATENTS

| Number | Name | Date |
|---|---|---|
| 475,783 | Manger et al. | May 31, 1892 |
| 484,408 | Clancy | Oct. 18, 1892 |
| 498,799 | Knowles | June 6, 1893 |
| 598,109 | Osgood | Feb. 1, 1898 |
| 633,499 | Bray | Sept. 19, 1899 |
| 692,881 | Lindsay | Feb. 11, 1902 |
| 742,098 | Proudfit | Oct. 20, 1903 |
| 857,137 | Winter | June 18, 1907 |
| 1,009,031 | Millea | Nov. 4, 1911 |
| 1,180,729 | Marshall | Apr. 25, 1916 |
| 1,346,525 | Beetem | July 13, 1920 |
| 1,520,503 | Mills | Dec. 23, 1924 |
| 1,667,124 | Liniger | Apr. 24, 1928 |
| 1,975,244 | Wiseman | Oct. 2, 1934 |
| 2,001,131 | Guhl | May 14, 1935 |
| 2,195,630 | Papp et al. | Apr. 2, 1940 |
| 2,239,026 | Wagner | Apr. 22, 1941 |
| 2,264,816 | Treanor | Dec. 2, 1941 |
| 2,359,846 | Hayman | Oct. 10, 1944 |